(12) United States Patent
Craddock et al.

(10) Patent No.: US 9,354,967 B1
(45) Date of Patent: May 31, 2016

(54) I/O OPERATION-LEVEL ERROR-HANDLING

(71) Applicant: INTERNATIONAL BUSINESS MACHINES CORPORATION, Armonk, NY (US)

(72) Inventors: David Craddock, New Paltz, NY (US); John R. Flanagan, Poughkeepsie, NY (US); Thomas A. Gregg, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,900

(22) Filed: Nov. 30, 2015

(51) Int. Cl.
*G06F 11/00* (2006.01)
*G06F 11/07* (2006.01)

(52) U.S. Cl.
CPC .......... *G06F 11/079* (2013.01); *G06F 11/0745* (2013.01); *G06F 11/0751* (2013.01)

(58) Field of Classification Search
CPC ............ G06F 11/0745; G06F 11/0772; G06F 11/1004
See application file for complete search history.

(56) References Cited

U.S. PATENT DOCUMENTS

| 3,931,471 | A | 1/1976 | Geuen | |
|---|---|---|---|---|
| 6,523,140 | B1 * | 2/2003 | Arndt | G06F 11/0745 714/43 |
| 6,647,528 | B1 | 11/2003 | Collette et al. | |
| 7,103,808 | B2 * | 9/2006 | Kitamorn | G06F 11/0712 714/43 |
| 7,213,180 | B2 | 5/2007 | Nakamura | |
| 8,180,928 | B2 | 5/2012 | Elzur et al. | |
| 8,190,983 | B2 | 5/2012 | Stenfort | |
| 8,417,911 | B2 | 4/2013 | Craddock et al. | |
| 8,615,622 | B2 | 12/2013 | Gregg et al. | |
| 8,645,606 | B2 | 2/2014 | Gregg et al. | |
| 8,645,767 | B2 | 2/2014 | Craddock et al. | |

(Continued)

FOREIGN PATENT DOCUMENTS

WO WO2006137029 A1 12/2006

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Marc Duncan
(74) *Attorney, Agent, or Firm* — Steven Chiu, Esq.; Kevin P. Radigan, Esq.; Heslin Rothenberg Farley & Mesiti P.C.

(57) ABSTRACT

Error-handling in a computing environment at an input/output (I/O) level is facilitated by associating a control element with an input/output (I/O) operation based on a command to perform the I/O operation between an adapter and memory. Based on detection of an error for the I/O operation, the control element is updated to indicate an error state, and completion of any uncompleted I/O request for the I/O operation is blocked, while other I/O requests for one or more other I/O operations are allowed to proceed between the adapter (or adapter function) and the memory. By way of example, the control element may be a cyclic redundancy check (CRC) control element used, for instance, by an I/O hub of the computing environment to accumulate during performance of the I/O operation an accumulated CRC value for the I/O operation to facilitate error checking of the operation.

20 Claims, 12 Drawing Sheets

(56) References Cited

U.S. PATENT DOCUMENTS

| | | | |
|---|---|---|---|
| 8,656,228 B2* | 2/2014 | Check | G06F 11/0724 714/42 |
| 8,677,180 B2 | 3/2014 | Bayer et al. | |
| 8,745,292 B2 | 6/2014 | Lais et al. | |
| 8,769,180 B2 | 7/2014 | Gregg et al. | |
| 8,910,031 B1 | 12/2014 | Liu et al. | |
| 8,910,983 B1 | 12/2014 | Neff | |
| 8,918,573 B2 | 12/2014 | Gregg et al. | |
| 9,047,082 B2 | 6/2015 | Gopal et al. | |
| 2001/0004761 A1 | 6/2001 | Zehavi | |
| 2004/0078685 A1 | 4/2004 | Glass | |
| 2009/0248942 A1 | 10/2009 | Kloeppner | |
| 2009/0313411 A1* | 12/2009 | Stenfort | G06F 11/1004 710/306 |
| 2010/0269021 A1* | 10/2010 | Gower | G06F 11/10 714/764 |
| 2011/0320887 A1* | 12/2011 | Craddock | G06F 11/0745 714/49 |
| 2013/0086435 A1* | 4/2013 | Craddock | G06F 11/0745 714/49 |
| 2015/0082080 A1 | 3/2015 | Lin et al. | |

OTHER PUBLICATIONS

IBM, "z/Architecture Principles of Operation," IBM® Publication No. SA22-7832-10, Eleventh Edition, Mar. 2015, pp. 1-1732.

IBM, "Power ISA™ Version 2.07B," International Business Machines Corporation, Apr. 9, 2015, pp. 1-1527.

Hyun et al., "The Design of PCI Express for Future Communication Platform", IEEE Proceedings of Intelligent Signal Processing and Communication Systems (ISPACS.2004), Nov. 18-19, 2004, (6 pages).

Byszuk et al., "Implementation of PCIe-SerDes-DDR3 Communication in a Multi-FPGA Data Acquisition System", Photonics Applications in Astronomy, Communications, Industry, and High-Energy Physics Experiments, SPIE vol. 8903, 89032A (2003) (6 pages).

IBM, "Creating Diagnostic ECC Memory Error in an Embedded System", IP.com Publication No. IPCOM000170164, May 10, 2008 (8 pages).

Anonymous, "Method for Determining the DMA Descriptor Containing Page Fault Address Caused by Bit Flip Error", IP.com Publication No. IPCOM000239354, Nov. 1, 2014 (4 pages).

Craddock et al., "I/O Operation-Level Error Checking", U.S. Appl. No. 14/953,873, filed Nov. 30, 2015 (56 pages).

Craddock et al., "List of IBM Patents & Patent Applications Treated as Related", U.S. Appl. No. 14/953,900, filed Nov. 30, 2015, dated Nov. 30, 2015, (2 pages).

Craddock et al., Office Action for U.S. Appl. No. 14/953,873, filed Nov. 30, 2015, dated Feb. 5, 2016 (9 pages).

* cited by examiner

| ERROR | SOURCE | PROBABLE CAUSE | DTE0 | DTE1 | CCE |
|---|---|---|---|---|---|
| DMA ERRORS | I/O HUB | FIRMWARE DESIGN ERROR | | | NO ACTION (ALTERNATIVE: PUT THE CCE INTO ERROR STATE RATHER THAN DTE1) |
| MSI ERRORS | | | | ERROR STATE | |
| PCI ERRORS | | PCI ERROR | ERROR STATE: ADAPTER NEEDS TO BE RESTARTED | | |
| INVALID ADDRESS (& ZONE LIMIT) | | SOFTWARE ERROR | | NO ACTION | |
| KEY VIOLATION | | | | | |
| STORAGE UE | HOST MEMORY SUBSYSTEM | HDW ERROR | | NO ACTION (ALTERNATIVE: PUT DTE1 INTO ERROR STATE RATHER THAN CCE) | ERROR STATE |
| KEY UE | | | | | |
| CACHE UE | | | | | |
| DATA CORRUPTED | | | | | |
| COMMAND REJECT | | | | | |
| MALFORMED COMMAND | | | | | |
| NodeID LOCKED | | | | | |

FIG. 8

I/O OPERATION-LEVEL ERROR-HANDLING

BACKGROUND

The Peripheral Component Interconnect express (PCIe) is a component-level interconnect standard that defines a bidirectional communication protocol for transactions between input/output (I/O) adapters and host systems. PCIe communications are encapsulated in packets according to the PCIe standard for transmission on a PCIe bus. Transactions originating at input/output (I/O) adapters and ending at host systems are referred to as up-bound transactions. Transactions originating at host systems and terminating at I/O adapters are referred to as down-bound transactions. The PCIe topology is based on point-to-point unidirectional links that are paired (e.g., one up-bound link, one down-bound link) to form the PCIe bus. The PCIe standard is maintained and published by the Peripheral Component Interconnect Special Interest Group (PCI-SIG).

Many input/output protocols require end-to-end data protection, including, for instance, FICON®, T11, T10 DIF, etc. Better data protection could be achieved by moving the generation and checking closer to the application. Software generation and checking would be closest to the application, but could impose performance and CPU utilization penalties. Existing solutions typically provide the checking offloaded into the adapter. For instance, a checksum offload may be provided. However, this has certain deficiencies, including, the end checking being further from the application. Further, the adapters available in the industry do not support all checking protocols, such as FICON® Cyclic Redundancy Check (CRC).

SUMMARY

Shortcomings of the prior art are overcome and additional advantages are provided through the provision of a system for facilitating error-handling in a computing environment. The system includes a memory, and a processing device communicatively coupled to the memory, wherein the system performs a method including: based on a command to perform an input/output (I/O) operation between an adapter and memory of the computing environment, associating, by an I/O hub of the computing environment, a control element with the I/O operation; based on detection of an error for the I/O operation, updating, by the I/O hub, the control element to indicate an error state; and based on detection of the error for the I/O operation, blocking completion of any uncompleted I/O requests for the I/O operation, while allowing other I/O requests for one or more other I/O operations between the adapter and the memory to continue.

In another aspect, a method is provided for facilitating error-handling in a computing environment. The method includes: based on a command to perform an input/output (I/O) operation between an adapter and memory of the computing environment, associating, by an I/O hub of the computing environment, a control element with the I/O operation; based on detection of an error for the I/O operation, updating, by the I/O hub, the control element to indicate an error state; and based on detection of the error for the I/O operation, blocking completion of any uncompleted I/O requests for the I/O operation, while allowing other I/O requests for one or more other I/O operations between the adapter and the memory to continue.

In a further aspect, a computer program product is provided for facilitating error-handling in a computing environment. The computer program product includes a computer readable storage medium having program instructions embodied therewith, the program instructions being executable by a processing device to cause the processing device to perform a method comprising: based on a command to perform an input/output (PO) operation between an adapter and memory of the computing environment, associating, by an I/O hub of the computing environment, a control element with the I/O operation; based on detection of an error for the I/O operation, updating, by the I/O hub, the control element to indicate an error state; and based on detection of the error for the I/O operation, blocking completion of any uncompleted I/O requests for the I/O operation, while allowing other I/O requests for one or more other I/O operations between the adapter and the memory to continue.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 8 depicts one embodiment of I/O operation error-handling in a computing environment with CRC control element processing, in accordance with one or more aspects of the present invention;

DETAILED DESCRIPTION

In accordance with one or more aspects of the present invention, a system, method, computer program product for facilitating I/O operation-level error checking in a computing environment are provided. Advantageously, error checking is facilitated by providing I/O operation specific CRC value accumulating within a processing device of the computing environment, such as, for instance, with an I/O hub (or adapter bridge) of the computing environment. The error checking approach disclosed herein is based on defining a new cyclic redundancy check (CRC) control element (CCE) and using the CCE in accumulating, for instance, by the I/O hub, a CRC value for the I/O operation to facilitate error checking of the I/O operation. The CCE allows accumulation of the CRC value for the I/O operation notwithstanding that the data of the operation is transferred in fragments, and notwithstanding that a large number of I/O operations may be concurrently in process through the I/O hub.

In one or more other aspects of the present invention, a system, method and computer program product for facilitating I/O operation-level error-handling in a computing environment are provided. Advantageously, error-handling is facilitated by providing an I/O operation-specific control element, such as the above-summarized CRC control element, within a processing device of the computing environment, such as, for instance, an I/O hub (or adapter bridge) of the computing environment. The error-handling approach disclosed herein provides a facility to signal an error state, and a type of error for the error of the I/O operation within the control element, and based on detection of the error, completion of any uncompleted I/O requests for the I/O operation may be blocked, while other I/O requests for one or more other I/O operations between the adapter or adapter function and the system memory are allowed to continue. In this manner, error-handling is isolated to a specific I/O operation being processed between an adapter (or adapter function) and memory system of a computing environment, while other concurrently executing I/O operations between the same adapter (or adapter function) and the memory system of the computing environment are allowed to proceed without impact.

Figure 1:
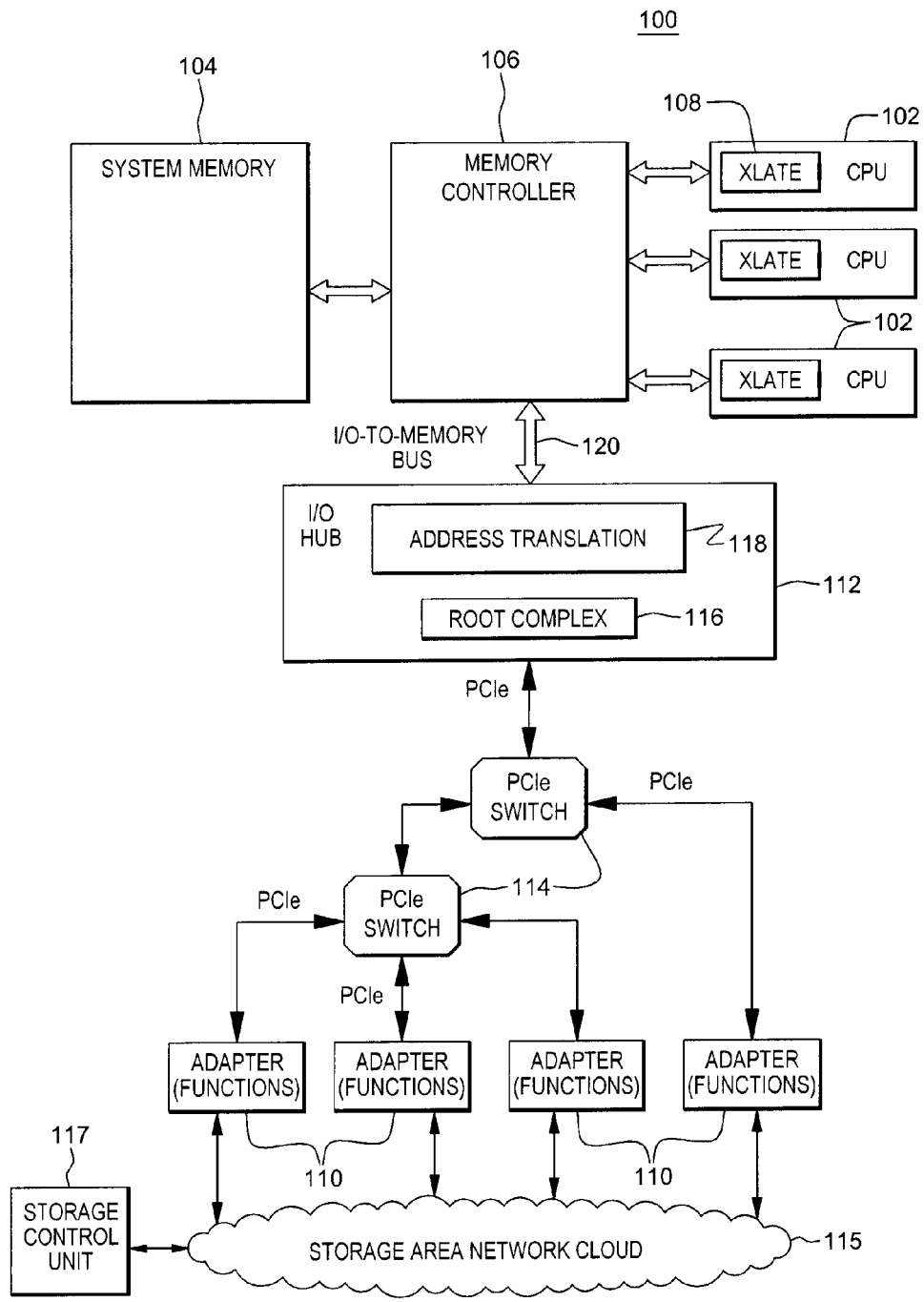
FIG. 1 depicts one embodiment of a computing environment to incorporate and use one or more aspects of the present invention.

One embodiment of a computing environment to incorporate and use one or more aspects of the present invention is described with reference to FIG. 1. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM® Publication No. SA22-7832-10, Eleventh Edition, March 2015, which is hereby incorporated herein by reference in its entirety. IBM®, System z®, z/Architecture® and FICON® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the translated address, is received by memory controller 106. In one example, memory controller 106 includes hardware, and is used to arbitrate for access to the system memory and to maintain the memory's consistency. This arbitration is performed for requests received from CPUs 102, as well as for requests received from one or more I/O adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request through a respective adapter port that requires access to system memory. The request is routed to an input/output hub 112 (e.g., a PCI hub) via one or more switches (e.g., PCIe switches) 114. In one example, the input/output hub includes hardware, with one or more state machines. In one or more embodiments, adapters 110 may couple to a storage area network cloud 115, which has an associated storage control unit 117

As used herein, the term adapter includes any type of adapter (e.g., storage adapter, network adapter, processing adapter, PCI adapter, cryptographic adapter, other type of input/output adapters, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. Moreover, in the examples presented herein, adapter is used interchangeably with adapter function (e.g., PCI function) unless otherwise noted.

The input/output hub 112 may include, for instance, a root complex 116 that receives the request from a switch 114. The request includes an input/output address to be translated, and thus, the root complex provides the address to an address translation unit 118. This unit may be, for instance, a hardware unit that translates the I/O address to an address directly usable to access system memory 104.

The request initiated from the adapter, including the translated address, is provided to memory controller 106 via, for instance, an I/O-to-memory bus 120. The memory controller performs its arbitration and forwards the request with the translated address to the system memory at the appropriate time.

As noted above, in one or more aspects, the present invention provides an I/O operation-level facility for data integrity context generation and/or checking. In one or more embodiments, the context generation is implemented in an I/O hub, such as a PCI adapter bridge host-bridge, of the computing environment. The approach described herein has numerous advantages, including: provision of hardware CRC generation and checking without performance or CPU utilization impact, and provision of an approach that is closer to application-level, end-to-end checking, than prior approaches. By way of example only, the concepts disclosed herein are described below in the context of a System z® computing environment. Those skilled in the art, however, will understand that the concepts disclosed are applicable to other computing environments, and that the present invention is not limited by the specific example(s) provided herein.

As noted, the I/O operation-level CRC value generation may be implemented in an I/O hub (or host-bridge), and can support end-to-end operation checking for a given adapter based, for instance, on the PCI bus and/or function. Note that in one specific example, the I/O hub may comprise a System z® host bridge coupling, for instance, one or more input/output adapters to a hardware system area of the computing environment. The I/O hub may support hundreds of thousands of concurrent I/O operations, each with its own data integrity generation and checking, while other PCI transactions are also handled without impact. As explained herein, portions of the PCI address may be used to locate and updating the end-to-end checking context (for instance, to maintain an accumulated CRC value, byte count, etc.). The checking approach disclosed herein may interlock with software for reporting and checking of errors, and allow for isolation of errors to a specific I/O operation. Further, special error-handling conditions may be implemented, such as early-end, misaligned data, etc.

By way of detailed example, a new mode may be added to an I/O hub and selected, for instance, using the PCI bus number, with a new definition of the PCI address being provided. The CRC engine disclosed herein has the ability to efficiently use the PCI address space. In the examples provided, it is assumed that up to 16 adapters may be supported, and therefore, there may be 16 PCI bus numbers. Further, dual port adapters may be provided with two function numbers, function zero and function one. The lowest order function number bit may select the device table entry pair.

Figure 2:
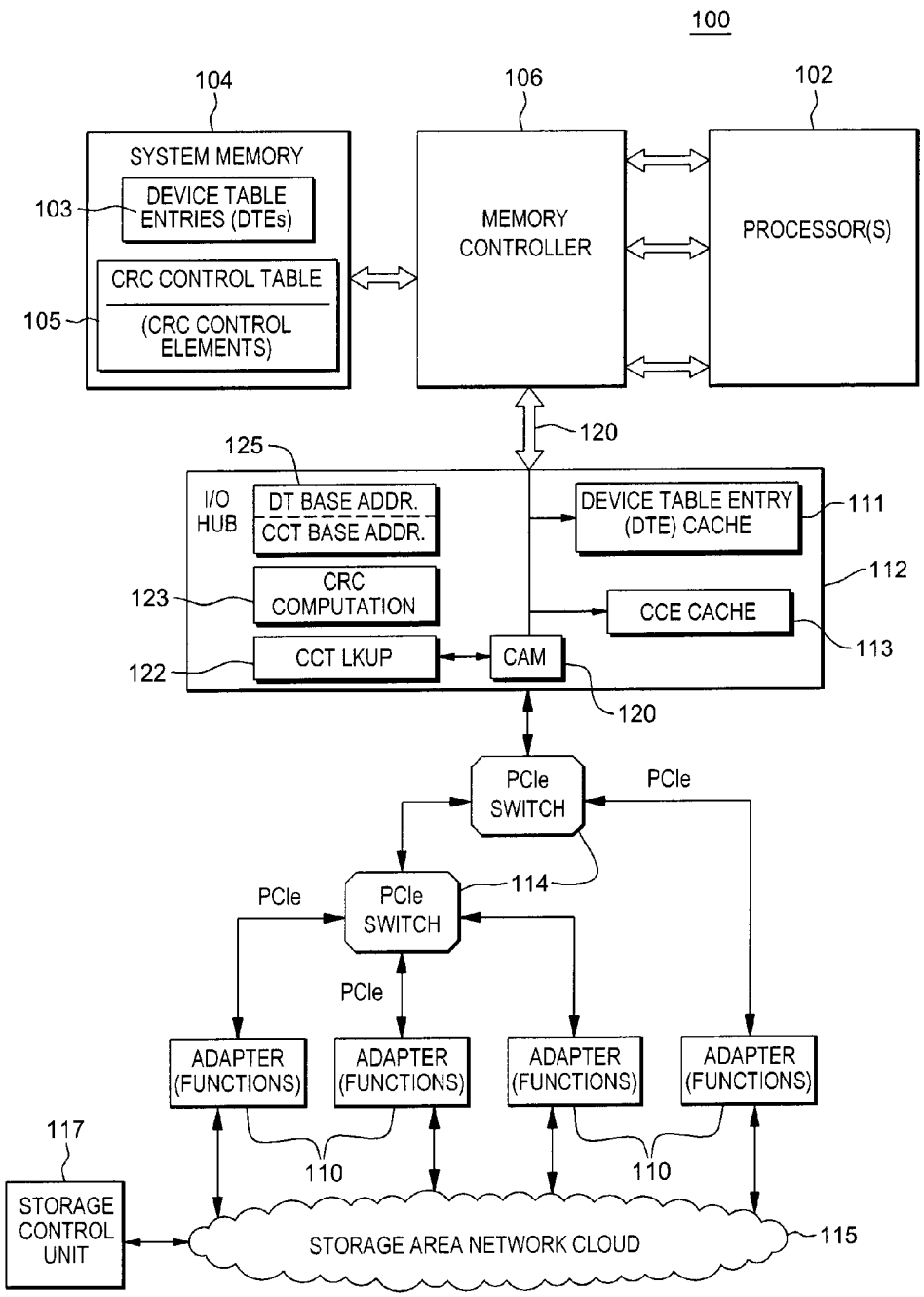
FIG. 2 depicts further details of a computing environment incorporating and using one or more aspects of the present invention.

As noted, in one or more embodiments, new structures are defined herein, referred to as CRC control elements (CCEs), which are distinct from device table entries (DTEs). As explained further below, CCEs may be identified (at least in part) by a combination of, for instance, the PCI requester ID and the PCIe address. As illustrated in FIG. 2, these entries may be cached in the I/O hub 112 in a CRC control cache (CCC) 113, which is distinct from a device table entry (DTE) cache 111, which may also be provided within I/O hub 112. The CRC control elements may be backed in system memory 104 in a CRC control table (CCT) 105, with one CCT being provided per I/O hub 112. Note that CRC control table 105 is distinct from the DTE 103 structure in system memory 104, as well.

In one or more implementations, each I/O operation to undergo operation-level error checking may require at least one CRC control element (CCE). For instance, a read I/O operation and a write I/O operation may each use a single, associated CCE. Within an I/O operation, a single CCE may be reused when there are multiple CRC flows.

Figure 3:
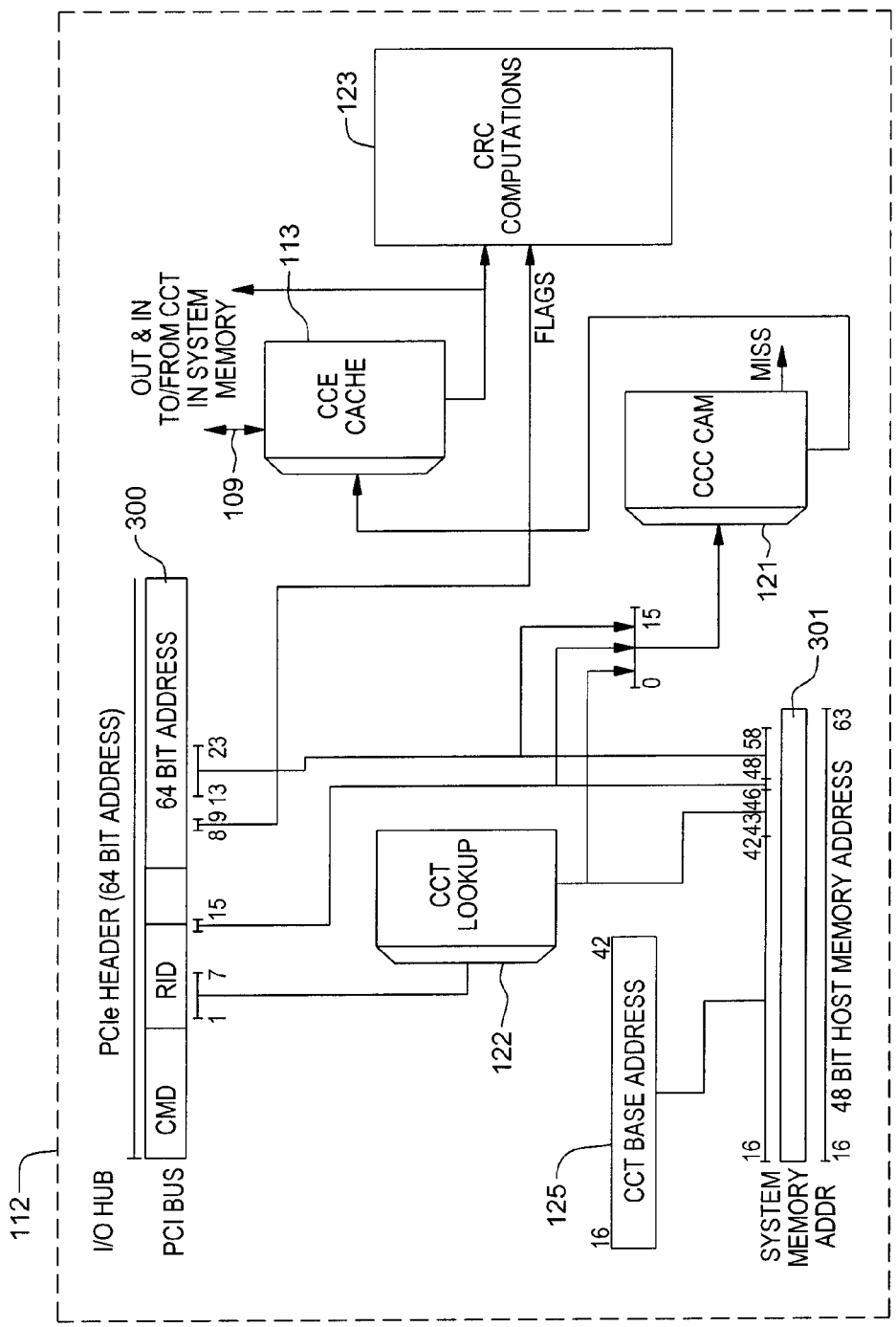
FIG. 3 is a schematic of one embodiment of CRC control element addressing for CRC value accumulating or computing, in accordance with one or more aspects of the present invention.

FIGS. 2 & 3 illustrate one embodiment of CRC control logic and addressing, in accordance with one or more aspects of the present invention. As illustrated, this logic and addressing may be implemented within the I/O hub or, more broadly, a processing device coupled to the adapters or I/O hub, or generally, in the I/O operation flow path. As illustrated in the figures, in addition to CCE cache 113, I/O hub 112 may include content-addressable memory (CAM) logic 120 to index into the device table to locate a device table entry, and CRC control table (CCT) lookup logic 122 to facilitate indexing into the CCT to locate a CCE. Additionally, CRC computational logic 123 and CCT base address and DTE base address logic 125 may be provided.

In the example of FIG. 3, a PCIe address 300, or more generally, an I/O address, associated with the I/O operation is received on the PCI bus at the I/O hub 112. In one or more implementations, the PCI bus number (1:7) in the request identifier (RID) field of the PCI header may be obtained and compressed to four bits using CCT lookup table 122 (128×4 bits). While allowing up to 16 adapters, 8 adapters per domain (for instance, two domains during fail over), the logic may compress the CRC control table address information by a factor of 8, from 16 MB to 2 MB. As illustrated in FIG. 3, the CCE index for the system memory address 301 being assembled may be taken directly from the PCIe address bits 13 to 23, and the low-order PCI function number bit 15. Thus, in one or more examples, 12 bits from the PCIe address 300 may be used directly in the system memory address 301 for the CRC control element lookup. Note that as an alternative, the CCT lookup table 122 could be eliminated, and the CRC control table 105 in system memory 104 could be indexed by the bus number bits 1:7, the function number bit (15), and the PCI address bits (13:23), in one or more other implementations.

Once completed, the 48-bit system memory address 301 could be used to access the CRC control table 105 (FIG. 2) in system memory 104 to load 109 (FIG. 3) the CCE in the CCE cache 113, as depicted. Further, as illustrated in FIG. 3, the 4-bit output of CCT lookup 122 may be combined with the PCIe function bit (15) and the (13:23) PCIe address bits to check, for instance, via a CCC content-addressable memory (CAM) logic 121, within or associated with CAM 120 of I/O hub 112, whether the desired CCE is currently in CCE cache 113. Once obtained, the CCE may be updated with current CRC computations 123 for, for instance, a data fragment of the I/O operation currently being handled in order to continue accumulating the desired CRC value for the I/O operation.

Note that the PCI address in a PCI memory request (DMA) may be set by firmware in the I/O adapter scatter/gather list. As used herein, firmware includes, for example, the microcode, millicode and/or macrocode of the processor. It includes, for instance, the hardware-level instructions and/or data structures used in implementation of higher-level machine code. In one embodiment, it includes, for instance, proprietary code that is typically delivered as micro-code that includes trusted software or microcode specific to the underlying hardware and controls operating system access to the system hardware.

The firmware may have complete control of most of the bits. In this way, higher-order address bits can be used in one or more implementations with the following definitions, wherein in one or more examples, the PCI addresses are each 64 bits. By way of specific example, the PCI address bits may include:

Storage key (PCI address bits 0:3).
CRC_DMA (PCI address bit 7). This bit controls whether CRC is generated and/or checked for this operation.
Flags (PCI address (PCI address bits 8:9). See further below.
Skip (PCI address bit 10). On a read operation, this bit tells the I/O hub to inhibit storing the data into system memory. It is a separate bit to allow it to be used with multiple encodings of the flags.
CRC flow ID (PCI address bits 13:23). Identifies up to 2048 simultaneous CRC flows and their associated CCEs for each adapter port.
ID check field (PCI address bits 24:31). In customer memory addresses, the unused 8 address bits (24:31) contain an ID which may be compared to an ID check field supplied in the CCE.
Customer memory address (PCI address bits 32:63). 32 bits is the minimum required for a 4G transfer.
System memory address (PCI address bits 24:63).

Figure 4:
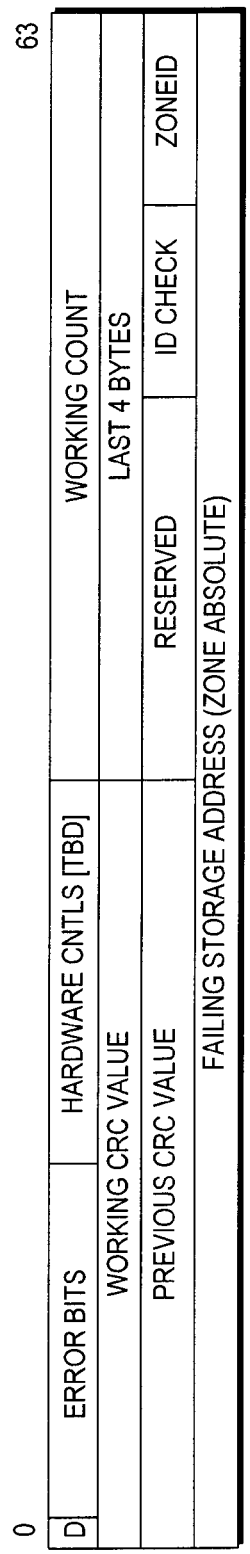
FIG. 4 depicts an exemplary CRC control element (CCE) useful in CRC value generation and checking, in accordance with one or more aspects of the present invention.

By way of example, FIG. 4 illustrates an exemplary CRC control element (CCE). In the illustrated example, the CRC control element includes the following fields:

Done (D). This bit is set by firmware to zero at the beginning of each I/O read or write operation. It is set to 1 when all associated data is stored in system memory, and all fields in the context have been updated.

Error bits.

CRC check. For read operations, the I/O hub compares the calculated CRC to the received CRC. If they are not equal, an error is recognized. Note that the CRC checking requirement may come from, for instance, SCSI tape CRC support where there are multiple CRC flows in a read operation; otherwise, the firmware could compare the CRC values in the CCE.

Count underflow (U). This bit may be set when the working count is zero and PCI memory requests attempt to move additional data to or from system memory. For PCI memory write requests, the additional data may be discarded. For PCI memory read requests, the split transaction may be terminated with a target abort (DMA read completion).

If a PCI memory request initiates a DMA fetch or store to system memory that results in a storage error (e.g., invalid address, protection check, etc.), the error response bits may be recorded here. In addition, the failing storage address (zone absolute) may be stored in words 6-7. For PCI memory write requests, any additional data received after the exception is discarded. For PCI memory read requests, the split transaction is terminated with a target abort. When any error bits is active, the CCE is in an error state.

Hardware controls.

Unprocessed byte count. This two bit field specifies the number of bytes in the last 4 bytes field that the CRC generator has not yet processed.

Working count. This register may be initialized by firmware. Note that this count does not include the final pad and CRC, but it does include any intermediate pad and CRC for PCI memory read requests. The count is decremented for each byte transferred to or from the I/O hub, with the exception of CRC control flags='11'b, as noted in the flags description below. The underflow bit is set if any PCI memory request attempts to decrement the count below 0, also as noted.

Working CRC value. This is initialized to the seed value either by firmware at the beginning of the operation, or at the completion of a PCI memory request with CRC control='10'b. At the end of each PCI memory request (except for CRC control='10'b), this field contains the starting CRC for the next PCI memory request in the operation.

Last 4 bytes. For PCI memory write requests, this field contains the last 4 data bytes received at the end of the request. At the end of each read operation, this field will then contain the CRC value received from the device regardless of whether the operation ended early or not. For both PCI memory read and write requests, this field is also used to hold residual data between PCI memory requests for storage alignment purposes. Note that since partial DMA writes may be required, implementations can also choose to store the residual data in system memory without waiting for the next PCI memory write request.

Previous CRC value. In general, the I/O hub checks CRC on read operations except for the early end case. Also, for PCI memory write requests, this contains the CRC value excluding the last 4 bytes. This will be the expected CRC value, which will match the received value in the 'last 4 bytes' field for a successful transfer. If the CRC does not match, both the expected and received values will be used for logging and debug.

Note: on read operations, the firmware may verify that the CRC was correct by comparing the 'last 4 bytes' and 'previous CRC' fields. Alternatively, firmware could compare the working CRC field with the well-known constant value for the CRC32 polynomial.

ID check field. Compare this 8 bit field to customer memory PCI address bits 24:31 in each PCI memory request. The value is chosen 'at random' by the firmware.

ZoneID. Specifies the zoneID for customer memory access.

Failing storage address. If any storage errors are encountered in the transfer, these words will contain the address on which the error was detected.

The firmware may set the flag bits in the PCI addresses in scatter/gather lists used by the adapter to move data to and from system memory. In this example, bits 8 and 9 are the flag bits, and bit 10 is the skip bit. Multiple PCI memory requests (DMAs) may be generated by the adapter to move data for a scatter/gather list segment. Therefore, the flag bits for multiple PCI memory requests for a particular segment will be the same. The pad and CRC fields have separate scatter/gather segments; therefore, their flag bits can be uniquely specified. Because the PCI memory request payloads for the pad and CRC segment are not transferred to/from system memory, PCI address bits 32:61 are arbitrary and can be chosen to avoid crossing a 4K boundary. Thus, these scatter/gather segments can always use a single PCI memory request.

The following flag definitions may be used.

'00'b No CRC computation for this transfer.

'01'b First or intermediate data transfer. CRC is accumulated across the data fragments in the PCI memory request using the working count and working CRC value.

'10'b Intermediate CRC transfer. This PCI memory request will transfer 0 to 3 pad bytes plus the 4 byte CRC value. For this encode, the PCI memory request payload is not transferred to or from system memory (address translation is not required). The pad bytes are used to compute an interim CRC value. For PCI memory read requests, the interim CRC value may be sent as the last 4 bytes of the request. After transferring the interim CRC value, the working CRC in the CCE should be set back to the seed value for subsequent data transfer. For PCI memory write requests, the interim CRC value is then compared with the CRC value in the last 4 bytes of the request. If the two values are equal, the working CRC value is set back to the seed value for subsequent data transfer. If the two values are not equal, an error bit is set in the CRC context, and all data from subsequent requests to the CRC context is discarded. The working count in the CRC context is decremented by the number of bytes in the request.

'11'b Final CRC transfer (read or write operations). This PCI memory request will transfer 0 to 3 pad bytes plus the 4 byte CRC value. For this encode, the PCI memory request payload is not transferred to or from system memory (address translation is not required). The working count in the CRC context is not decremented, and the working CRC word is not re-loaded with the starting seed. For PCI memory write requests, at the end of the transfer, the working CRC will contain the standard residual value if the expected and received CRC values matched. For PCI memory write requests, this data need not be stored into system memory.

Each CRC control cache entry has control bits indicating if the entry is full and how many outstanding DMA reads and writes to the host are pending (no response yet).

A Cast-out is when the I/O hub writes an entry from the cache back to the CCT. Before the hub writes the CCE back into the CCT, it must wait for all outstanding DMA reads and writes to the host to complete. Normally, the I/O hub will decrement the outstanding DMA request counter as the host returns responses until the counter reaches zero.

If the I/O hub continues to send PCI memory requests while the hub is attempting to cast out a CCE, an error may be detected, as discussed further below.

When a CCE is fetched, the I/O hub needs to observe the ordering rule that DMA reads from a system memory location cannot pass DMA writes to the same location. This ensures that the most recently cast-out CCE is re-fetched when needed.

Two new operational commands may be provided for system firmware to control the CRC hardware.

The 'cast-out' command operation is described above, and may be required only for early end read operations. It has a parameter of the CCE ID. If the entry specified is cached, the I/O hub stores it back into host memory.

The 'purge all' command is used during initialization and recovery.

In one or more implementations, the CRC calculation uses the working CRC value in the CCE. There are two start-up cases. First, at the very beginning of an I/O operation, the firmware sets the working CRC value to the CRC Seed. Second, when an intermediate flow finishes and the CRC compares equal, the CRC engine reloads the working CRC value in the CCE from the CRC register.

A CRC seed register may be provided in the I/O hub, and contain the starting CRC seed value. Since the CCE is reused over multiple CRC flows, a seed register is desired, and the adapter cannot use the 'old' working CRC value in the CCE when starting an intermediate CRC flow. Instead, the CRC generator is restarted from the seed register for each CRC flow.

As noted, in one or more embodiments, each adapter port (or PCI function) may have two DTEs called DTE0 and DTE1. Unlike normal prior art, CRC mode uses one DTE (DTE1) for all direct customer memory (a.k.a., LPAR memory) accesses.

A single DTE for customer memory reduces cache misses and saves PCI address bits. However, it causes the addition of zoneIDs in the CCEs for CRC mode.

In one or more implementations, DTE0 may be used for all accesses to system memory. It works similar to the prior art, but with a subset of the functions.

Base/limit checking keeps adapter confined to its private piece of memory.
Address translation is always disabled.
MSI control
All MSIs are through DTE0.
All errors while accessing system hardware and MSI processing effectively put the adapter into the error state.
DTE0 error state is not propagated to DTE1. The error will be recognized through code and/or adapter error status reports.

DTE1 may be used for all customer memory access, a single DTE.
DTE1 works mostly like the prior art, but there are a few exceptions.
Exception 1: The ZoneID comes from the CCE.
ZoneID Alternatives; could be in the PCI address (24:31) or PTE (1:7).
Exception 2: Certain errors no longer cause the DTE to go into the error state.
Base/limit checking is not required (set to largest window).
All addresses are translated using extended page mode.
The other translation modes are not used and are not defined in CRC mode. DTE1 is expected to specify extended page mode.
Single IOTA (input/output translation address) anchor.

Figure 5:
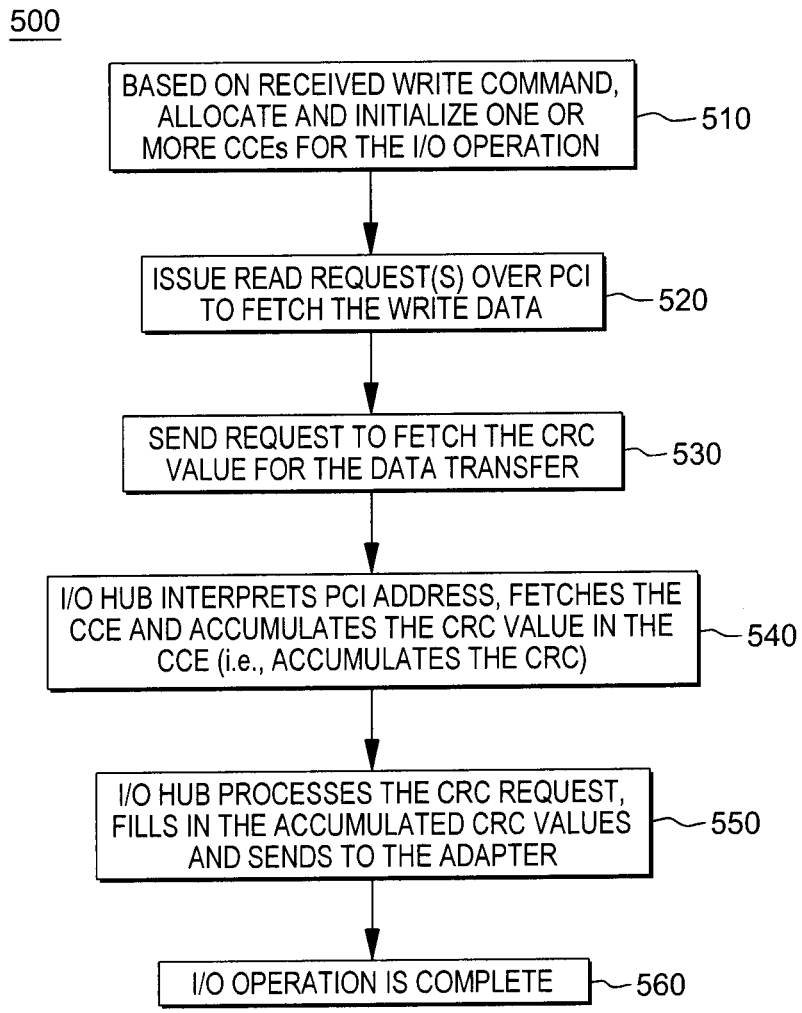
FIG. 5 depicts one embodiment of I/O write command and CRC control element processing, in accordance with one or more aspects of the present invention.
Figure 6:
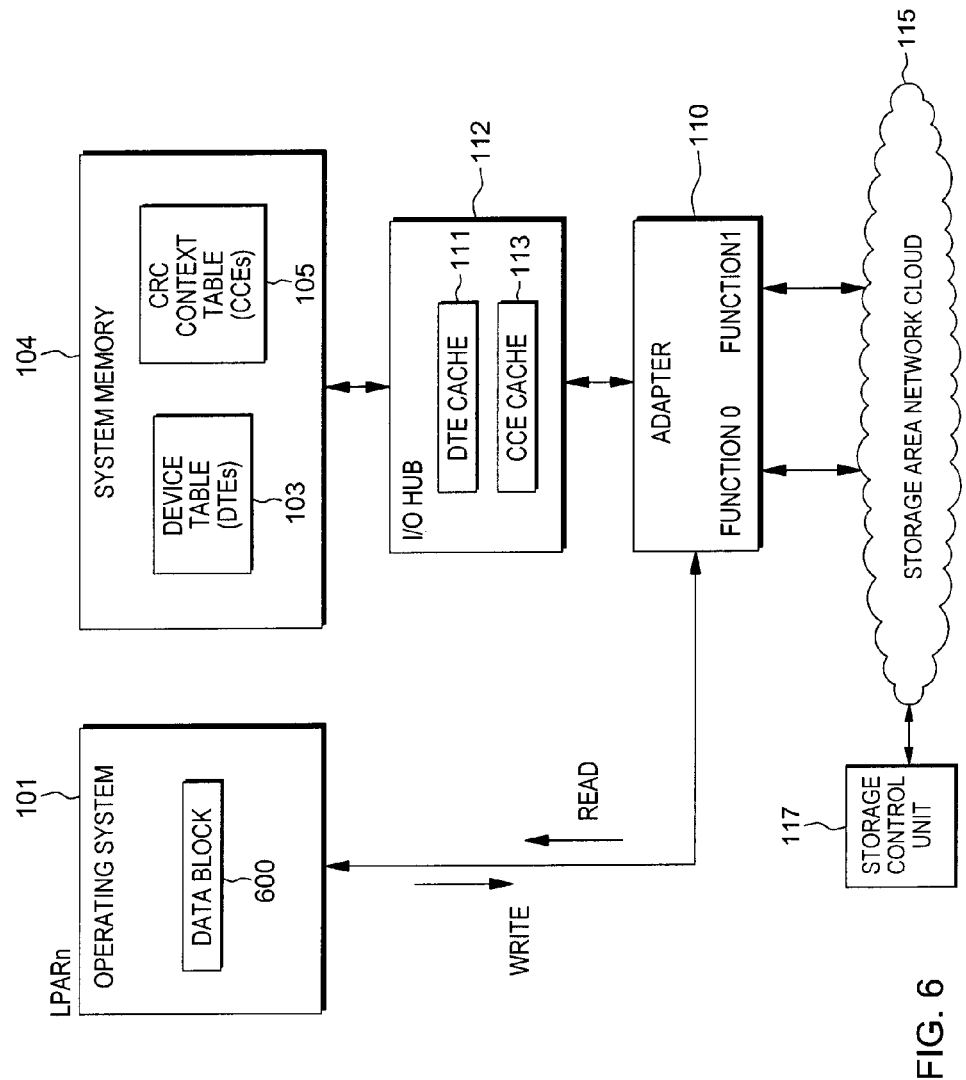
FIG. 6 is a simplified schematic of a computing environment incorporating and using CRC control element processing, and illustrating data flow for an input/output (I/O) operation, in accordance with one or more aspects of the present invention.
Figure 7:
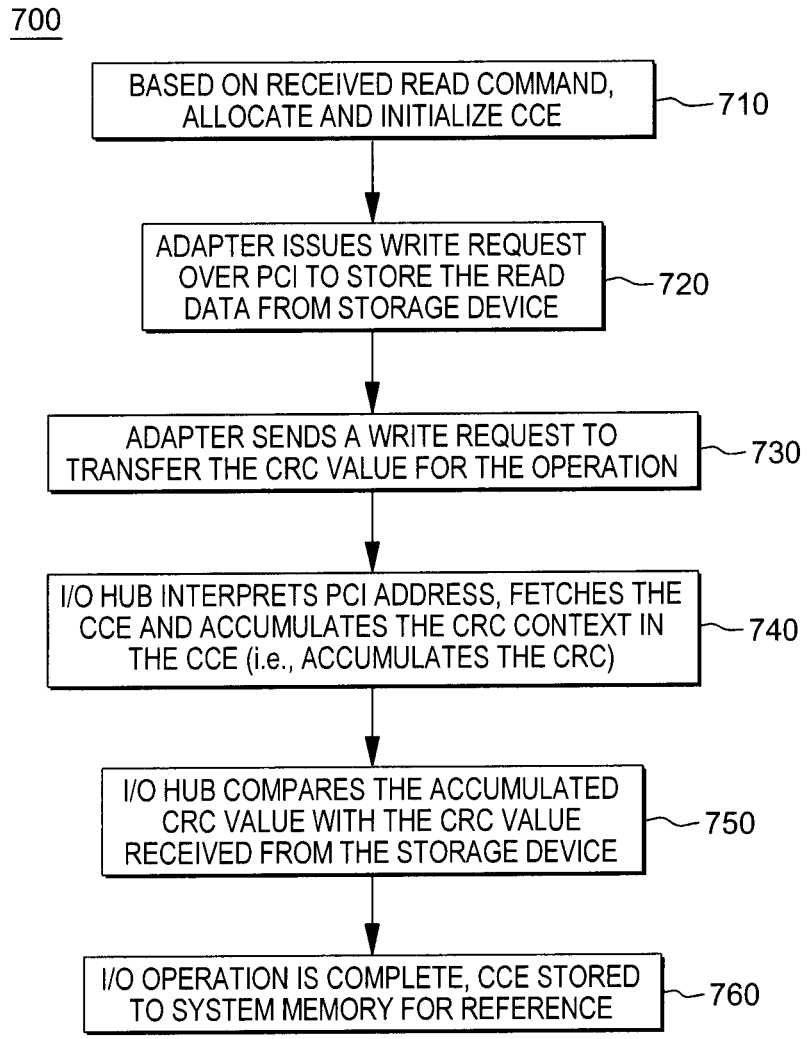
FIG. 7 depicts one embodiment of I/O read command and CRC control element processing, including error checking, in accordance with one or more aspects of the present invention.

FIGS. 5-7 illustrate examples of I/O write and read command processing with CRC accumulation at the I/O operation level in, for instance, the I/O hub, in accordance with one or more aspects of the present invention. Note that the I/O operation-level, CRC value accumulation approach disclosed herein may be implemented via one or more processing devices, disposed for instance, within the I/O hub, or external to the I/O hub of the computing environment.

Referring to FIGS. 5 and 6 collectively, an I/O write command may be issued or received, which will cause initialization of one or more CRC control elements for the I/O operation 510. This initialization may include setting the working count, working CRC value, zone ID, as well as initializing the done and error fields of the CCE(s). As one example, the I/O write operation may be commenced as part of a start subchannel instruction, wherein an adapter is signaled to start executing a particular I/O operation.

Assuming that the write operation is, for instance, an operation to write a 4K data block 600 (FIG. 6) from an operating system logical partition (LPAR) 101 to an adapter 110 for, for instance, storage in storage control unit 117 (FIG. 2), the adapter may issue multiple read requests over the PCI bus to fetch the write data 520 (FIG. 5). For instance, the adapter may send two DMA reads of 2K each, splitting the 4K request into two frames. In the PCIe address, the flag bits are set to 01, indicative of a first or intermediate data transfer for CRC purposes.

Additionally, the adapter may also issue a separate request to fetch the CRC value for the data transfer 530. By way of example, the adapter may send a DMA read of 4 bytes in length, with a PCIe address having flag bits set to 11, indicating a final CRC transfer for the write operation.

The I/O hub processes the DMA reads of 2K length with flag bits set to 01 by fetching the CCE, and while reading the requested data, accumulating (i.e., updating) the working CRC field in the CCE. The I/O hub sends the read responses, and decrements the working count with sending of each read response 540.

The I/O hub further processes the DMA read of 4 bytes with flags set to 11. This process includes passing the accumulated CRC values to, for instance, the adapter, for forwarding to the storage control unit with the data being written as an accumulated CRC value for the data 550. The I/O operation is complete 560 with, for instance, the ending status of the CCE context being, by way of example, done=1, error=0, U=0, and working count=0.

By way of further detail, when the I/O hub is processing the DMA read requests, the above-discussed PCI address bits may be used to access the CCE. At the beginning of the I/O operation, the CCE should not be in the CRC control cache. The I/O hub fetches the CCE, and if the CCC is full, another CCE needs to be caste out, that is, stored back to system memory. As PCI memory read requests are received, the I/O hub does the following based on fields in the CCE, and flags bits in the PCI address.

The done bit in the CCE should always be zero, otherwise, there is a design error.
If the working count ever goes below zero, the count underflow error is indicated. This could be a design error or an undetected error in the adapter.

If the PCI address flags indicate a first or intermediate data transfer ('01'b),
  The working CRC value in the CCE starts the CRC calculation.
  The unprocessed byte count in the CCE tells the I/O hub how many of the last 4 bytes should be used in the CRC calculation.
  The CRC calculation ends with the last full data word. Residual 1, 2, or 3 bytes are left in the last 4 bytes field of the CCE.
If the PCI Address Flags indicate an Intermediate CRC Transfer ('10'b),
  The data is not fetched from system memory.
  The working CRC value in the CCE starts the CRC calculation.
  The unprocessed byte count in the CCE tells the I/O hub how many of the last 4 bytes should be used in the CRC calculation.
  Note that if the unprocessed byte count is zero and the PCI memory read request has a count of 4 (no pad bytes), no further CRC calculation is required.
  The PCI address may be largely ignored except for the lowest order bits for alignment.
  Any pad bytes and the generated CRC are sent to the adapter as the PCI memory read completion payload.
  Reinitialize the working CRC value from the CRC seed register.
If the PCI Address Flags indicate a Final CRC Transfer ('11'b),
  Follows the same steps as the intermediate CRC transfer ('10'b), but the CCE is always cast-out.
  The working count is checked to see if it went to zero.

Referring to FIGS. 7 & 6 collectively, an I/O read command may be issued or received, which will cause allocation and initialization of one or more CRC control elements (CCEs) for the I/O operation 710. This initialization may include setting the working count, working CRC value, zone ID, as well as initializing the done and error fields of the CCE(s). As one example, the I/O read operation may be commenced as part of a start sub-channel instruction, where an adapter is signaled to start executing a particular I/O operation.
  Assuming that the read operation is, for instance, an operation to read a 4K data block 600 (FIG. 6) from storage in a storage area network cloud 115 to an operating system logical partition (LPAR) 101, the adapter may issue one or more write request over the PCI bus to write the read data 720. For instance, the adapter may send a DMA write of 4K, with a PCI address having flag bits set to 01, indicative of a first or intermediate data transfer for CRC purposes. Additionally, DTE1, function 0, key=K, CCE=n, address=Block 1, may be set in a PCI address.
  Additionally, the adapter may issue a separate request to transfer the CRC value received from the storage controller 730. By way of example, the adapter may send a DMA write of 4 bytes in length, with a PCIe address having flag bits set to 11, indicating a final CRC transfer for the write operation.
  The I/O hub processes the DMA write of 4K length with flag bits set to 01 by fetching the CCE, and while writing the requested data, accumulating (i.e., updating) the working CRC field in the CCE 740. The working count is decremented, and a check is made by the I/O hub to ensure the working count is not less than 0.
  The I/O hub further processes the DMA write of 4 bytes with flags set to 11. This process may include fetching the CCE, and checking to ensure that the done bit=0. The resultant, accumulated CRC value may, if desired, be compared with the received CRC value to check for an error 750. Assuming that the CRC compare is good, then the I/O operation is complete, and the CCE may be stored to system memory for reference 760.
  By way of further detail, when the I/O hub is processing a DMA write request, the above-referenced PCI address may be used to access the CCE. The requester ID (bus number and function number bits) and PCI address bits 13:23 may be used to access the CCE, as described. At the beginning of the I/O operation, the CCE should not be in the CRC control cache. The I/O hub fetches the CCE and if the CCC is full, another CCE needs to be cast out, that is, stored back to system memory. As the PCI memory write requests are received, the I/O hub performs the following based on fields in the CCE, and flag bits in the PCI address.
  The done bit in the CCE should always be zero, otherwise, there is a design error.
  If the working count ever goes below zero, the count underflow error is indicated. This is a design error or an undetected error in the adapter.
  If the PCI address flags indicate a first or intermediate data transfer ('01'b),
    The working CRC value in the CCE starts the CRC calculation.
    The unprocessed byte count in the CCE tells the I/O hub how many of the last 4 bytes should be used in the CRC calculation.
    The CRC calculation ends with the last full data word. Residual 1, 2, or 3 bytes may be left in the last 4 bytes field of the CCE.
  If the PCI address flags indicate an intermediate CRC transfer ('10'b),
    The data is not stored in system memory.
    The working CRC value in the CCE starts the CRC calculation.
    The unprocessed byte count in the CCE tells the I/O hub how many of the last 4 bytes should be used in the CRC calculation.
    Note that if the unprocessed byte count is zero and the PCI memory write request has a count of 4 (no pad bytes), no further CRC calculation is required.
    Note also that the PCI address is largely ignored except for the lowest order bits for alignment.
    The received CRC (last 4 bytes) is compared to the calculated or accumulated CRC.
      Compare equal: Reinitialize the working CRC value from the CRC seed register. No further action is taken.
      Compare not Equal: Set error bit in CCE. CCE is in the error state. The CCE is cast-out to system memory.
  If the PCI address flags indicate a final CRC transfer ('11'b),
    Follows the same steps as the intermediate CRC transfer ('10'b), but the CCE is always cast-out.
    The working count is checked to see if it went to zero. This is different from the 'early end' situation described below.
    The working CRC value may be reinitialized to the CRC seed register value because the information is the same as the last 4 bytes (if the CRC compare is correct). No new information is provided by not reinitializing this register.
  There may be a situation where a read operation could end "early." If neither an intermediate CRC transfer nor a final CRC transfer ('11'b), and a PCI memory write request is received, and the request does not exhaust the byte count and the operation ends, the I/O hub is not aware of the "early end" condition. In this case, the pad bytes, if any, may be stored in customer memory, along with the CRC context. Information in the CCE can be used by the firmware to complete the operation. The firmware will see status from the adapter, and it can force the I/O hub to store the CCE into backing store using the cast-out command to I/O hub. The firmware may examine the 'done' bit in the CCE in backing store to see if or when the hub has updated it.

Further, note that if the skip flag is on in the PCI address, the above-noted steps may be performed, but the data discarded. For instance, with the skip flag set on, the CRC will also be discarded.

As noted initially, in one or more further aspects, a system, method, and computer program product for facilitating I/O operation-level error-handling in a computing environment are also provided herein. Advantageously, error-handling is facilitated by providing an I/O operation-specific control element for indicating an error state of the I/O operation and, optionally, an error type of the error for the I/O operation. In one or more implementations, the control element employed may be the above-discussed, cyclic redundancy check (CRC) control element (CCE) used, for instance, in the accumulating a CRC value for an I/O operation to facilitate error checking of the I/O operation.

In accordance with the protocol discussed below in connection with FIGS. 8 & 9, based on detection of an error for an I/O operation, the associated control element may be updated to indicate the error state, and in one or more embodiments, the error type. Further, based on detection of the error for the I/O operation, completion of any uncompleted I/O requests for the I/O operation are blocked, while other I/O requests for one or more other I/O operations between the same adapter (or adapter function) and the memory of the computing environment, are allowed to continue. In this manner, an I/O operation error is isolated to the I/O operation level, in that the same adapter and memory, or the same adapter function and system memory, are allowed to continue to process other I/O operations which may be concurrently in process as the I/O operation with the identified error state. Note that detection of the error for the I/O operation may be achieved using any conventional error detection approach provided within existing computing environments, such as the above-referenced System z® computing environment offered by International Business Machines Corporation, of Armonk, N.Y. (USA).

By way of example, FIG. 8 depicts a summary of one embodiment of error-handling in a computing environment, in accordance with one or more aspects of the present invention.

Because the CRC engine may be used for all customer data, and because data for each operation has to be controlled separately, this same control point (e.g., CCE) makes isolating address, key, and memory errors not only practical, but also straight forward. With this error-handling, the traditional System z I/O Architecture detection and error-handling can be fully implemented for certain errors, such as direct memory access (DMA) errors, message signal interrupt (MSI) errors, and peripheral interconnect (PCI) errors, while invalid address, key, and/or memory errors (for example, program errors) may be indicated using a control element such as disclosed herein.

For instance, as explained below, for certain errors, such as invalid address, exceeding a zone limit (i.e., an LPAR memory space), a key violation, storage, key or cache uncorrectable errors, corrupted data, or other low-level rejected commands, node ID locked, etc., the control element associated with the I/O operation may be employed to indicate the error state, and track the type of error for the computing environment. Note that this facility may be in addition to handling of errors detected by conventional DTE0 processing and DTE1 processing. Although, as indicated in Table 8, as an alternative, the control element (e.g., CCE) may be placed in the error state rather than DTE1, for certain types of detected errors, such as a DMA error, MSI error, or PCI error. Note in this regard, that when the control element indicates an error state for the associated I/O operation, no action is necessary with respect to the DTE1. By avoiding placing DTE1 into error state, then other I/O requests for one or more other I/O operations between the same adapter (or adapter function) and memory for the same LPAR are allowed to continue to process without effect from the detected I/O operation error.

By way of further explanation, when an error is detected in accessing customer memory (e.g., an LPAR's memory), the single DTE for customer data (DTE1) is not always put into the error state. Instead, the CCE for the operation may be put into the error state and updated to include the error information. Only certain errors may, in one or more embodiments, be reported in the CCE. For instance, invalid address, key violations, and UEs may be included (and zone relation table (ZRT) limit check), while other errors, such as DMA errors, MSI errors, and PCI errors, may continue to be reported using DTE1.

No new I/O hub error interrupts are required to implement the control element aspects discussed herein. For read operations (PCI memory writes), the adapter is not aware of any errors detected by the hub. Firmware needs to examine the CCE for any error information. In the early end read situation, firmware also has to see if the CRC is correct (compare the last 4 words to the previous CRC); the I/O hub can detect CRC errors for read operations, as discussed above. For write operations (PCI memory reads), any errors cause PCI completer aborts to the adapter. The adapter then signals the error to the host in the status, and the firmware (e.g., memory subsystem) reads the error information in the CCE. Error information may be placed into the CCE, and then stored back into system memory using the cast-out mechanism.

The errors detected by DTE0 operations have the following behavior.
 All of these errors are considered design errors or uncorrectable hardware errors, and recovery restarts the adapter function.
 DTE0 goes into the error state, and the entire adapter function is stopped.
 Two kinds of errors:
  'Passed' errors from memory
  I/O hub detected errors (base/limit)
 No change is contemplated to put the corresponding DTE1 into the error state thus blocking all access to customer memory.

The errors detected by DTE1 operations have the following behavior.
 For DTE1, the present firmware managed mode may use one DTE for each LPAR, and software errors may cause the adapter to be recovered for all operations in progress for the LPAR that caused the error. The other LPARs continue to use the adapter. In CRC mode, customer memory access errors have the following behavior.
  Many 'passed' errors are reported to the firmware through the CCE. The DTE is not put into the error state.
  Either all 'passed' errors may put the CCE in the error state, or all but (for instance) invalid address, key violation, or uncorrectable errors (UEs) may put DTE1 into the error state.

Figure 9:
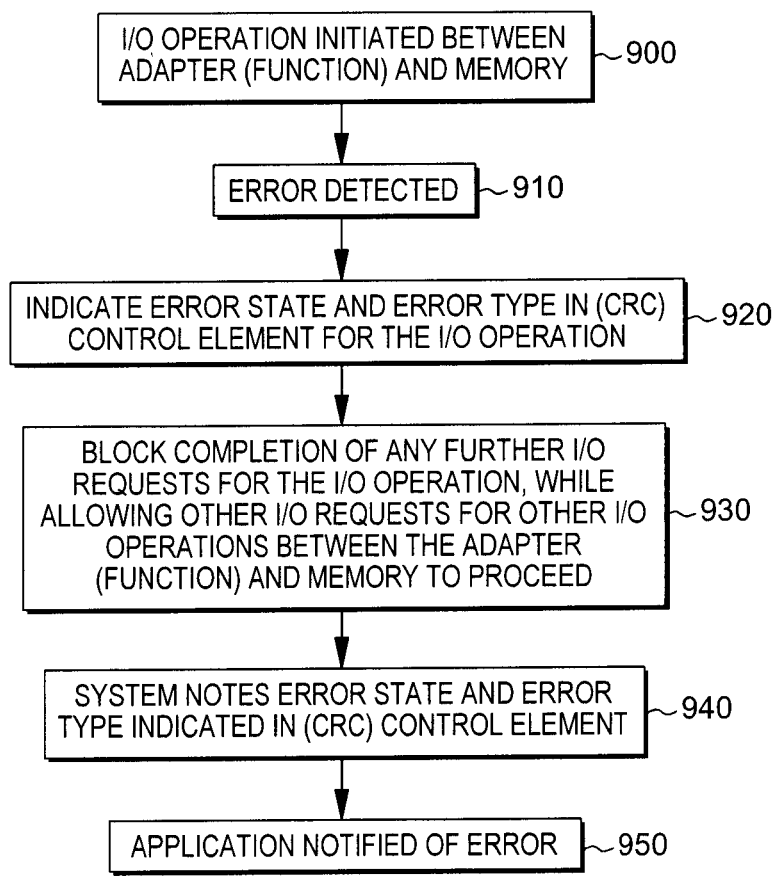
FIG. 9 depicts one embodiment of an error-handling process using a control element, in accordance with one or more aspects of the present invention.

By way of further example, FIG. 9 depicts one embodiment of an error-handling process using a control element, in accordance with one or more aspects of the present invention.

In FIG. 9, an I/O operation is initiated between an adapter (or an adapter function) and memory 900, such as described above. The I/O operation may include one or more I/O requests to write or read data. During performance of the I/O operation, an error is detected 910, with detection of the error being by any conventional approach implemented, for instance, in available systems such as the above-referenced System z® offered by International Business Machines Corporation.

As described above, based on issuance of a command to perform the input/output (I/O) operation between, for instance, the adapter and memory of the computing environment, a control element (such as the above-described CRC control element) is associated with the I/O operation. Note in this regard that, in terms of error-handling, the control element may be the CRC control element, or a separately defined control element that is associated with the I/O operation at its start. In one or more implementations, based on detection of an error for or during performance of the I/O operation, the control element is updated to indicate an error state and, optionally, the type of error that has occurred for the I/O operation, as described above 920. With this approach, based on detection of the error for the I/O operation, completion of any uncompleted I/O requests for the I/O operation are blocked, while any other I/O requests for one or more other I/O operations between the same adapter (or adapter function) and the memory are allowed to continue 930. That is, in an environment where there are multiple I/O operations concurrently being processed between an adapter (or adapter function) and the memory of the computing environment, only the I/O operation with the error is affected by the error, and terminated, while the other I/O operations continue to be processed without effect. Thus, a customer application within the computing environment may have multiple concurrent I/O operations active at a time between a particular adapter and the memory, while only the I/O operation with the error is affected (i.e., are blocked by the I/O hub once the CCE for that operation is in the error state). The other I/O operations for that customer application (e.g, in the same LPAR or different LPARs) are allowed to continue. This is distinct from an approach where the DTE1 is placed into error state, terminating the current I/O operations for that customer application.

The system, such as the memory subsystem, notes the error state and error type indicated in the control element, which as noted above, may be updated by the I/O hub 940, and using standard interrupt processing, the customer application involved with the I/O operation, may be notified of the error 950.

In one or more implementations, the control element employed in the error-handling described above comprises the initially presented cyclic redundancy check (CRC) control element (CCE) for the I/O operation. Thus, the method may further include, prior to detection of an error for the I/O operation, using the CRC control element in accumulating with performance of the I/O operation an accumulated CRC value for the I/O operation to facilitate error checking of the I/O operation. This accumulating, prior to detection of the error for the I/O operation, may include performing CRC calculations for the I/O operation with performance of the I/O operation to accumulate the accumulated CRC value. For instance, where data of the I/O operation is transferred in data fragments, then prior to detection of the error in the I/O operation, the CRC control element may be updated for each transferred data fragment during the accumulating of the CRC for the I/O operation.

Advantageously, the inventive aspects disclosed herein extend the prior art by disclosing a protocol-independent facility for efficiently handling thousands of concurrent streams, while still providing error isolation to particular I/O operations.

Advantageously, the concepts disclosed herein can generate and/or check CRC values at arbitrary boundaries within the data stream. The inventive aspects disclosed herein include managing operation-level CRC, which inherently saves state information across potentially thousands of concurrent operations, and precisely identifies which of those operations may have an error. For instance, the concepts disclosed herein teach generation checking of CRC values for data streaming across a PCIe bus, with potentially thousands of concurrent operations being multiplexed across the bus simultaneously (data in flight).

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 10:
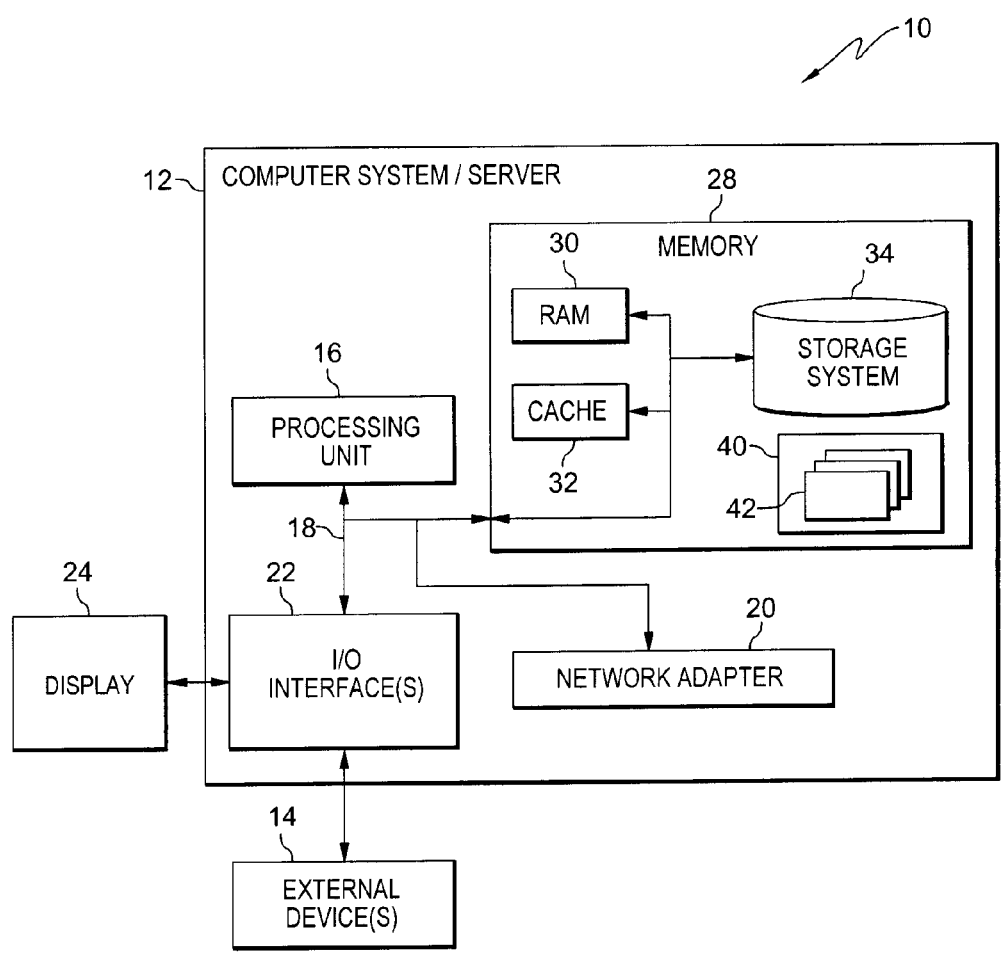
FIG. 10 depicts one embodiment of a cloud computing node.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
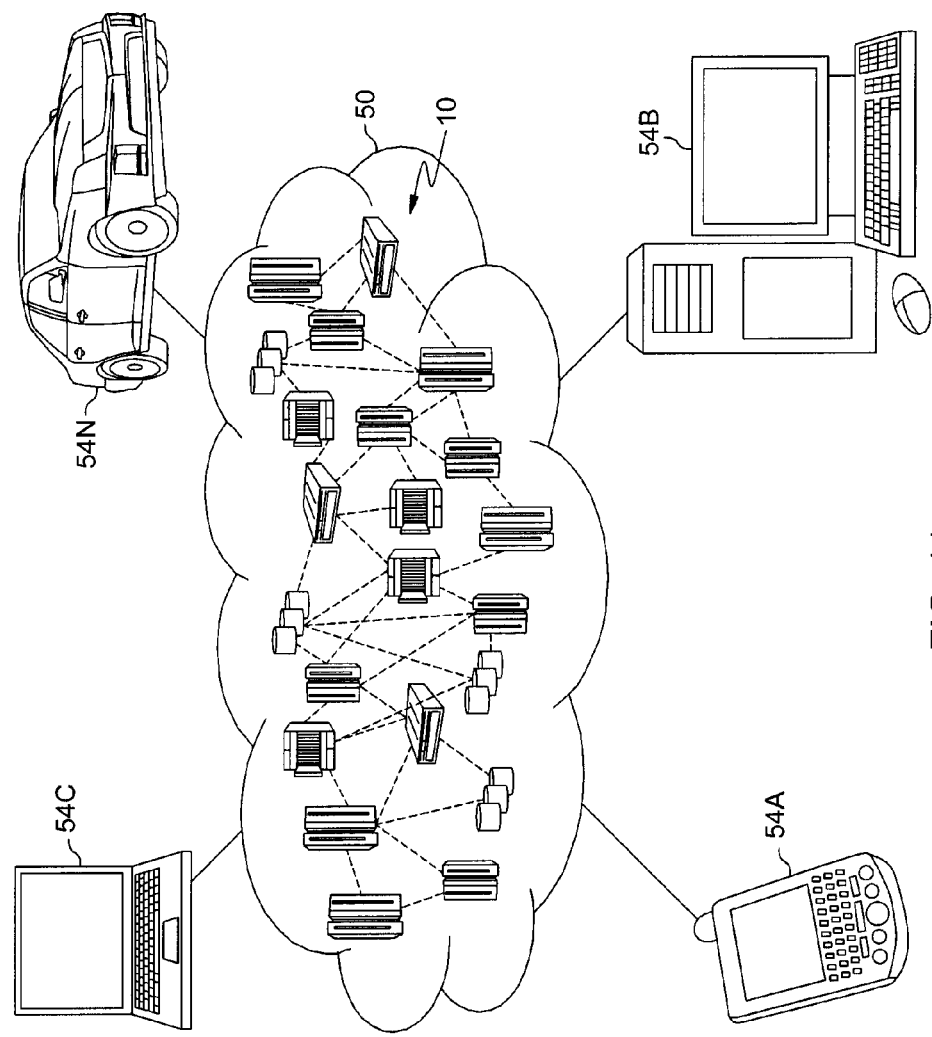
FIG. 11 depicts another embodiment of a cloud computing environment.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. B are intended to be illustrative only and that computing nodes 10 and cloud computing environment 50 can communicate with any type of computerized device over any type of network and/or network addressable connection (e.g., using a web browser).

Figure 12:
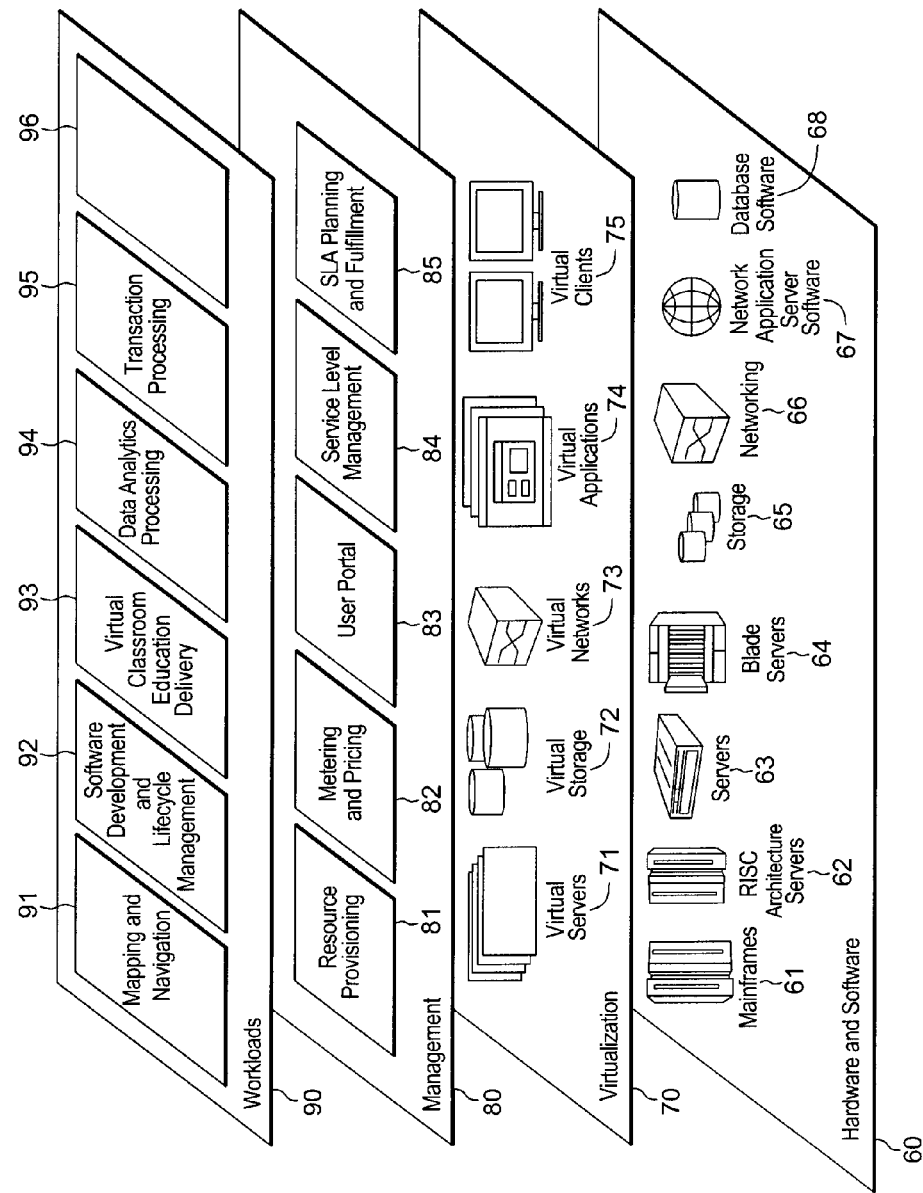
FIG. 12 depicts one example of abstraction model layers.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and MAIN IDEA 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system for facilitating error-handling in a computing environment, the system comprising:
   a memory;
   a processing device communicatively coupled to the memory, wherein the system performs a method comprising:
      based on a command to perform an input/output (I/O) operation between an adapter and memory of a computing environment, associating, by an I/O hub of the computing environment, a control element with the I/O operation;
      based on detection of an error for the I/O operation, updating, by the I/O hub, the control element to indicate an error state; and
      based on detection of the error for the I/O operation, blocking completion of any uncompleted I/O requests for the I/O operation, while allowing other I/O requests for one or more other I/O operations between the adapter and the memory to continue.

2. The system of claim 1, wherein the command is a command to perform the I/O operation between an adapter function of the adapter and the memory, and the blocking blocks completion of any uncompleted I/O requests for the I/O operation, while allowing other I/O requests for one or more other I/O operations between the adapter function and the memory to continue.

3. The system of claim 1, wherein the I/O hub of the computing environment is coupled between the adapter and the memory.

4. The system of claim 1, wherein the control element comprises a cyclic redundancy check (CRC) control element (CCE) for the I/O operation, and wherein the method further comprises, prior to detection of the error for the I/O operation, using the CRC control element in accumulating with performance of the I/O operation an accumulated CRC value for the I/O operation to facilitate error checking of the I/O operation.

5. The system of claim 4, wherein the accumulating comprises, prior to detection of the error for the I/O operation, performing CRC calculations for the I/O operation with performance of the I/O operation to accumulate the accumulated CRC value for the I/O operation.

6. The system of claim 4, wherein the data of the I/O operation is transferred in data fragments, and prior to detection of the error for the I/O operation, the CRC control element is updated for each transferred data fragment during the accumulating of the CRC value for the I/O operation.

7. The system of claim 1, wherein the updating further comprises updating the control element to indicate an error type of the error for the I/O operation, the error type comprising at least one of an invalid address, a key violation, or a memory error associated with the I/O operation.

8. The system of claim 1, wherein the updating further comprises updating the control element to indicate an error type of the error for the I/O operation, the error type comprising at least one of a direct memory access (DMA) error, a message signal interrupt (MSI) error, a peripheral component interconnect (PCI) error, an invalid address error, a key violation error, or a system memory error associated with the I/O operation.

9. The system of claim 1, wherein the computing environment reads the error state from the control element, and based thereon, notifies an application of the computing environment associated with the I/O operation of the error.

10. A method comprising:
based on a command to perform an input/output (I/O) operation between an adapter and system memory of a computing environment, associating, by an I/O hub of the computing environment, a control element with the I/O operation;
based on detection of an error for the I/O operation, updating, by the I/O hub, the control element to indicate an error state; and
based on detection of the error for the I/O operation, blocking completion of any uncompleted I/O requests for the I/O operation, while allowing other I/O requests for one or more other I/O operations between the adapter and the memory to continue.

11. The method of claim 10, wherein the command is a command to perform the I/O operation between an adapter function of the adapter and the memory, and the blocking blocks completion of any uncompleted I/O requests for the I/O operation, while allowing other I/O requests for one or more other I/O operations between the adapter function and the memory to continue.

12. The method of claim 10, wherein the I/O hub of the computing environment is coupled between the adapter and the memory.

13. The method of claim 10, wherein the control element comprises a cyclic redundancy check (CRC) control element (CCE) for the I/O operation, and wherein the method further comprises, prior to detection of the error for the I/O operation, using the CRC control element in accumulating with performance of the I/O operation an accumulated CRC value for the I/O operation to facilitate error checking of the I/O operation.

14. The method of claim 13, wherein the accumulating comprises, prior to detection of the error for the I/O operation, performing CRC calculations for the I/O operation with performance of the I/O operation to accumulate the accumulated CRC value for the I/O operation.

15. The method of claim 13, wherein data of the I/O operation is transferred in data fragments, and prior to detection of the error for the I/O operation, the CRC control element is updated for each transferred data fragment during the accumulating of the CRC value for the I/O operation.

16. The method of claim 10, wherein the updating further comprises updating the control element to indicate an error type of the error for the I/O operation, the error type comprising at least one of an invalid address, a key violation, or a system memory error associated with the I/O operation.

17. The method of claim 10, wherein the updating further comprises updating the control element to indicate an error type of the error for the I/O operation, the error type comprising at least one of a direct memory access (DMA) error, a message signal interrupt (MSI) error, a peripheral component interconnect (PCI) error, an invalid address error, a key violation error, or a memory error associated with the I/O operation.

18. The method of claim 10, wherein the computing environment reads the error state and error type from the control element, and based thereon, notifies an application of the computing environment associated with the I/O operation of the error.

19. A computer program product for facilitating error-handling in a computing environment, the computer program product comprising:
a non-transitory computer readable storage medium having program instructions embodied therewith, the program instructions being executable by a processing device to cause the processing device to perform a method comprising:
based on a command to perform an input/output (I/O) operation between an adapter and memory of a computing environment, associating, by an I/O hub of the computing environment, a control element with the I/O operation;
based on detection of an error for the I/O operation, updating, by the I/O hub, the control element to indicate an error state; and
based on detection of the error for the I/O operation, blocking completion of any uncompleted I/O requests for the I/O operation, while allowing other I/O requests for one or more other I/O operations between the adapter and the memory to continue.

20. The computer program product of claim 19, wherein the control element comprises a cyclic redundancy check (CRC) control element (CCE) for the I/O operation, and wherein the method further comprises, prior to detection of the error for the I/O operation, using the CRC control element in accumulating with performance of the I/O operation an accumulated CRC value for the I/O operation to facilitate error checking of the I/O operation.

* * * * *